(12) United States Patent
Kastens (10) Patent No.: US 9,440,757 B2
(45) Date of Patent: Sep. 13, 2016

(54) PROCESS FOR FORMING AND FILLING A POUCH ON A VFFS MACHINE

(71) Applicant: Liqui-Box Corporation, Richmond, VA (US)

(72) Inventor: Stephen Markey Kastens, Plain City, OH (US)

(73) Assignee: LIQUI-BOX CORPORATION, Richmond, VA (US)

(*) Notice: Subject to any disclaimer, the term of this patent is extended or adjusted under 35 U.S.C. 154(b) by 0 days.

(21) Appl. No.: 15/086,232

(22) Filed: Mar. 31, 2016

(65) Prior Publication Data

US 2016/0207655 A1 Jul. 21, 2016

Related U.S. Application Data

(62) Division of application No. 13/615,817, filed on Sep. 14, 2012, now Pat. No. 9,327,856.

(60) Provisional application No. 61/534,435, filed on Sep. 14, 2011, provisional application No. 61/549,840, filed on Oct. 21, 2011.

(51) Int. Cl.
*B65B 9/213* (2012.01)
*B65B 9/20* (2012.01)
*B65B 51/30* (2006.01)
(Continued)

(52) U.S. Cl.
CPC .......... *B65B 9/213* (2013.01); *B65B 9/2028* (2013.01); *B65B 51/303* (2013.01); *B65B 59/02* (2013.01); *B29C 65/02* (2013.01); *B29C 65/7891* (2013.01); *B29C 66/1122* (2013.01); *B29C 66/4312* (2013.01); *B29C 66/4322* (2013.01); *B29C 66/71* (2013.01); *B29C 66/8225* (2013.01); *B29C 66/8246* (2013.01); *B29C 66/8322* (2013.01); *B29C 66/83221* (2013.01);
(Continued)

(58) Field of Classification Search
None
See application file for complete search history.

(56) References Cited

U.S. PATENT DOCUMENTS 2,692,073 A * 10/1954 Kelly .................... B65B 25/043
198/377.1
3,129,546 A * 4/1964 Redmond ............... A01J 21/02
53/122

(Continued)

OTHER PUBLICATIONS

International Patent Application No. PCT/US2012/055332: International Search Report and Written Opinion dated Feb. 20, 2013, 7 pages.

(Continued)

*Primary Examiner* — Hemant M Desai
*Assistant Examiner* — Mobeen Ahmed
(74) *Attorney, Agent, or Firm* — Baker & Hostetler LLP (57) ABSTRACT

A process for forming and filling pouches on a vertical, fill, seal (VFFS) machine having an apparatus for producing an oscillating force that actuates a mechanism comprising: a frame; channels attached to sides of frame; a servo motor positioned on top of frame; a shaft assembly having an off-set slider assembly where top end is attached to servo motor and bottom end is positioned adjacent to bottom of the frame; a pusher block having a rectangular shaped opening therein and horizontal rails each attached to opposite sides of block and slidably positioned in channels of frame and off-set slider assembly positioned in rectangular shaped opening of pusher block; an actuation mechanism attached to pusher block that provides a forward and backward oscillating motion to pusher block; and a heat sealing mechanism actuated by the actuation mechanism.

2 Claims, 4 Drawing Sheets

(51) Int. Cl.
  *B65B 59/02* (2006.01)
  *B29C 65/00* (2006.01)
  *B29C 65/78* (2006.01)
  *B29C 65/02* (2006.01)
  *B65B 61/02* (2006.01)

(52) U.S. Cl.
  CPC .......... *B29C 66/849* (2013.01); *B29C 66/919* (2013.01); *B65B 61/025* (2013.01); *Y10T 29/53* (2015.01)

(56) References Cited

U.S. PATENT DOCUMENTS

| | | | | |
|---|---|---|---|---|
| 3,299,608 | A * | 1/1967 | Orloff | B65B 11/52 425/216 |
| 4,779,400 | A * | 10/1988 | Hoskinson | B65B 9/087 53/374.8 |
| 4,947,621 | A | 8/1990 | Christine | |
| 5,377,474 | A * | 1/1995 | Kovacs | B65B 9/2028 53/451 |
| 5,463,851 | A * | 11/1995 | Nagai | B29C 65/18 53/374.8 |
| 5,931,075 | A * | 8/1999 | Yamaguchi | B23D 21/00 74/45 |
| 6,003,286 | A * | 12/1999 | Goodman | B65B 5/08 53/244 |
| 6,182,426 | B1 | 2/2001 | Pritchard | |
| 7,484,347 | B2 | 2/2009 | Konno | |
| 7,654,802 | B2 * | 2/2010 | Crawford, Jr. | F04B 23/06 417/273 |
| 7,950,208 | B2 | 5/2011 | Mancin | |
| 2003/0093971 | A1 * | 5/2003 | Terminella | B65B 9/20 53/133.4 |
| 2004/0255879 | A1 * | 12/2004 | Zaytsev | F01B 9/02 123/55.2 |
| 2005/0229541 | A1 * | 10/2005 | Griggs | B65B 9/15 53/396 |
| 2006/0252626 | A1 * | 11/2006 | Delisle | B29C 65/08 493/394 |
| 2009/0127323 | A1 * | 5/2009 | Zeiler | B29C 53/50 229/116 |
| 2009/0260333 | A1 * | 10/2009 | Kammler | B65B 51/30 53/550 |
| 2009/0263050 | A1 * | 10/2009 | Eberhardt | B29C 65/18 383/205 |
| 2010/0101188 | A1 | 4/2010 | Koike | |
| 2010/0132315 | A1 * | 6/2010 | Gunn | B29C 66/1122 53/548 |
| 2010/0263336 | A1 * | 10/2010 | Uttaro | B26D 1/565 53/550 |
| 2010/0269452 | A1 * | 10/2010 | Veix | B29C 66/8246 53/370.7 |
| 2011/0185681 | A1 * | 8/2011 | Ansinn | B29C 65/18 53/452 |
| 2011/0192117 | A1 * | 8/2011 | Lubezny | B29C 65/02 53/456 |
| 2011/0271812 | A1 * | 11/2011 | Maier | B26D 1/085 83/651 |
| 2013/0255201 | A1 * | 10/2013 | Holzem | B65B 7/00 53/557 |
| 2014/0260500 | A1 * | 9/2014 | Fleischer | B21D 22/28 72/349 |

OTHER PUBLICATIONS

U.S. Appl. No. 61/534,435, Specification filed Sep. 14, 2011, 16 pages.
U.S. Appl. No. 61/539,840, Specification filed Oct. 21, 2011, 18 pages.

* cited by examiner

PROCESS FOR FORMING AND FILLING A POUCH ON A VFFS MACHINE

CROSS REFERENCE TO RELATED APPLICATIONS

This application is a divisional application of U.S. patent application Ser. No. 13/615,817, filed Sep. 14, 2012, which claims the benefit of U.S. Provisional Application No. 61/534,435, filed Sep. 14, 2011, and U.S. Provisional Patent Application No. 61/549,840, filed on Oct. 21, 2011. These applications are incorporated herein in their entirety.

FIELD OF INVENTION

In one aspect, the present invention relates to improved equipment for use in flexible liquid packaging. In another aspect, it relates to a process for forming a flexible liquid packaging pouch using this equipment.

BACKGROUND

Flexible packaging is used for many consumer goods, particularly food and beverages that are often packaged in pouches of flexible materials. The term "liquid-packaging" is understood by those skilled in the art to refer to both liquids and other flowable materials or product.

These packages are formed, filled, and sealed by a vertical form, fill, seal ("VFFS") machine. Typically useful VFFS machines are shown in U.S. Pat. No. 4,947,621 and U.S. Pat. No. 6,182,426. However, commercially available VFFS machines pose a problem in that, to adjust its film heat sealing mechanism, their operation must be stopped. Such adjustments may be required, for example, when a different film is used; when the package requires another level of seal strength to compensate for the wear of parts of the heat sealing mechanism such as the heat sealing jaws; or when the pressure applied to the heat sealing jaws needs to be increased to form an adequate seal for the package. The present invention permits adjusting pressure applied by the heat sealing jaws without stopping the machine and without substantially losing any flexible packages being made.

SUMMARY

This invention relates to a process for forming and filling pouches on a vertical, fill, seal (VFFS) machine comprising the steps of:
(1) providing a continuous tube of flexible and sealable film;
(2) supplying the continuous tube with a predetermined flow-rate of flowable material fed from an external balance tank; wherein said balance tank comprises an inlet for said flowable material, at least one outlet for said flowable material, and at least one stand-pipe within said balance tank and over said at least one outlet, wherein said stand-pipe is flowably attached to said at least one outlet and filling the pouch;
(3) sealing the pouch with heat sealing jaws used in conjunction with the VFFS machine;
wherein the VFFS machine comprises an assembly for producing an oscillating force that actuates a mechanism and comprises the following:
a. a frame having a top, a bottom, and opposing sides;
b. horizontal channels each attached to said opposing sides of said frame;
c. a servo motor positioned on the top of said frame;
d. a shaft assembly having a top end and a bottom end, wherein said top end is attached to said servo motor and said bottom end is positioned adjacent to said bottom of said frame, and
wherein an off-set slider mechanism is centrally positioned on the shaft assembly;
e. a pusher block having a rectangular-shaped opening therein, and horizontal rails each attached to the opposite sides of said pusher block,
wherein each said horizontal rails is slidably positioned in said horizontal channels attached to said opposing sides of said frame, and
wherein said off-set slider mechanism of said shaft assembly is positioned in said rectangular-shaped opening of said pusher block;
f. an actuation means attached to said pusher block; and
g. a mechanism that is actuated by said actuation means;
whereby said servo motor, when actuated, drives said shaft assembly positioned in said pusher block,
whereby said off-set slider mechanism moves said pusher block and provides a forward and backward motion to said pusher block sliding in said horizontal rails, and whereby said pusher block provides an oscillating force to said actuation means, thereby activating and deactivating said off-set slider mechanism.

BRIEF DESCRIPTION OF THE DRAWINGS

Embodiments of the present invention will be described with reference to the accompanying drawings, wherein like reference numerals denote like parts, and in which.

DETAILED DESCRIPTION OF ILLUSTRATIVE EMBODIMENTS

This invention relates to process for filling pouches with a VFFS machine having an assembly that produces an oscillating force that actuates a mechanism that in turn activates the heat sealing device of the VFFS machine.

The assembly comprises the following components:
a frame having a top, bottom and opposing sides;
parallel horizontal channels are each attached to the opposing sides of the frame;
a servo motor is positioned on the top of the frame;
a shaft assembly that has a top end that is attached to the servo motor and a bottom end that is positioned in a bearing attached to the bottom of the frame and an off-set slider mechanism centrally positioned on the shaft assembly;
a pusher block that has a rectangular shaped opening therein in which the off-set slider mechanism of the shaft assembly is positioned and the block has horizontal rails on opposite sides of the block and the rails are slidably positioned in the horizontal channels attached to the frame; an actuation means is attached to the pusher block; and
a mechanism, typically, the heat sealing mechanism of the VFFS machine, is actuated by the actuation means. The heat sealing mechanism seals the film used in the VFFS machine to form flexible packages or pouches containing product.

In the operation of the assembly, the servo motor drives the shaft assembly having the off-set slider mechanism that is positioned in the pusher block thereby moving the pusher block and provides a forward and backward motion to the pusher block that slides in the horizontal channels of the frame and the pusher block provides an oscillating force to the actuation means thereby activating and deactivating the heat sealing mechanism of the VFFS machine that seals the film used to form a flexible liquid-package.

The assembly is particularly suited for use with VFFS machines since it solves the problem of adjusting the film heat sealing mechanism of the VFFS machine. Current commercial VFFS machines require the machine to be stopped when an adjustment needs to be made. Such adjustments may be required when a different film is placed in use to form the pouch, or the pouch requires another level of seal strength due to weight of the product being packaged or when parts of the heat sealing mechanism become worn, and to compensate for this wear, the pressure applied to the heat sealing jaws needs to be increased to form an adequate seal for the pouch. The assembly of the present invention permits adjustment of pressure being applied by the heat sealing jaws of the heat sealing mechanism without stopping the machine and without any substantial loss of flexible packages being made.

It should be noted that the assembly can be used in conjunction with other equipment, but it is particularly useful to be used in conjunction with heat sealing mechanism of a packaging machine that forms a variety of seals of a flexible pouch or package, such as horizontal seals, vertical seals, diagonal seals, circular seals, semi-circular seals or other seal configurations that may be required.

In the description below, "flowable material" and "product" are used interchangeably.

In a typical operation of a VFFS machine to form flexible packages or pouches, a pouch is formed of a sealable film having suitable properties (that is, strength, flexibility, etc.) for carrying the desired product. A continuous film tube is made from a flexible film that is known to a person of ordinary skill in the art. Flexible films include any suitable plastic film material, such as linear low-density polyethylene.

While pouch or package volume is not particularly restricted, preferred pouch volume ranges from about 0.5 L to about 2 L, but larger pouches can be formed in the range of about 3 L to about 5 L. The volume of product that is to be placed in the pouch will determine the volume of the pouch.

Figure 1:
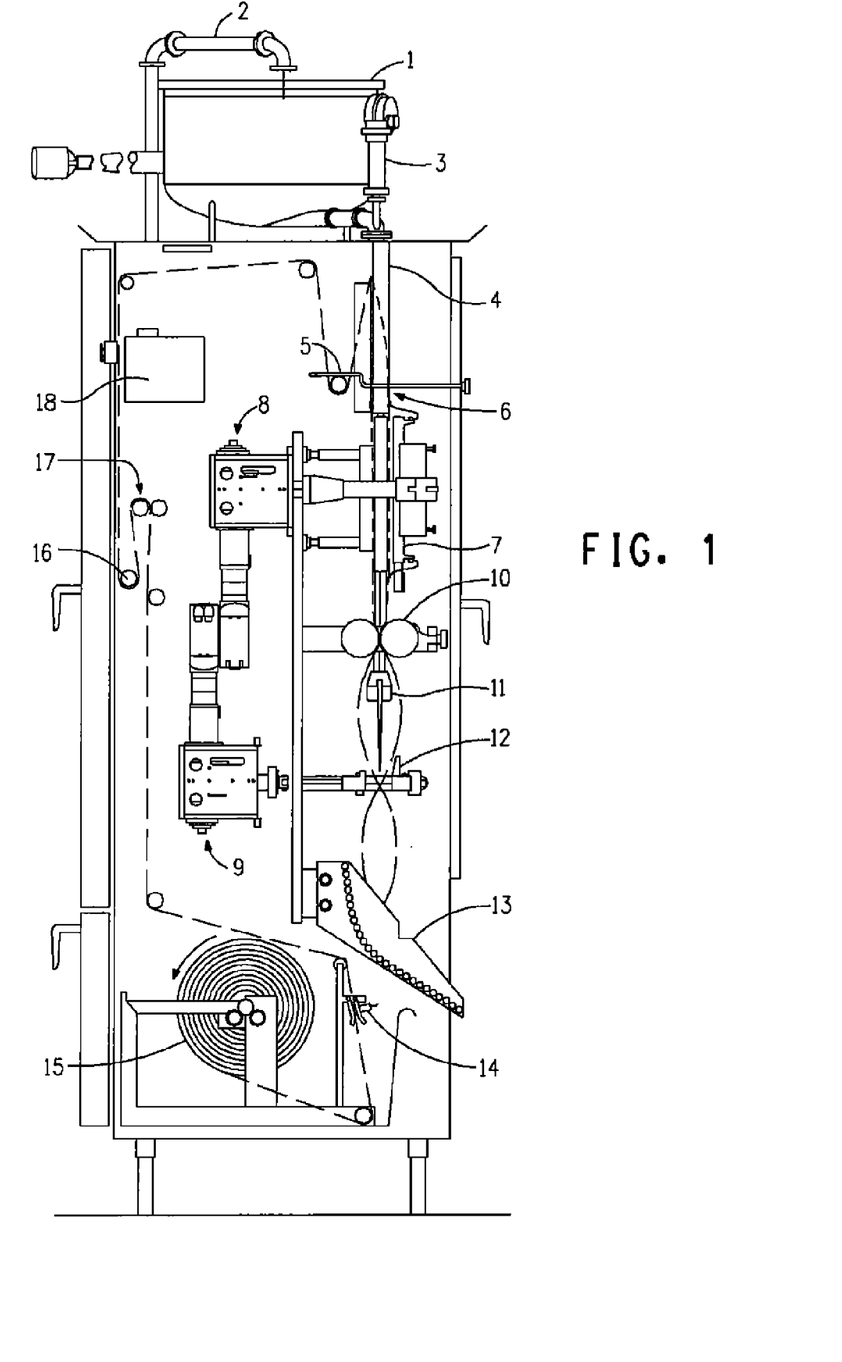
FIG. 1 illustrates a schematic view of the assembly positioned in a VFFS machine.

FIG. 1 shows a schematic view of a conventional pouch-formation process of a VFFS machine. During operation, a product continuously enters the head tank 1 via pipe 2. A filling valve-actuating mechanism 3 meters out an exact amount of product that is to be filled into a flexible pouch via filler pipe 4. The film used for forming the pouch is unwound from a suspended film roll 15 around various directional rolls, around unwind drive rollers 17, over dancer roller 16, through an optional coder 18. The coder typically places registration marks on the film and places data codes on the films, e.g. date by which the product is to be used. The film passes under film guide bar 5 and then into the vertical forming section 6 of the VFFS machine where the film is folded into a tube and vertically sealed via vertical sealing jaws 7. The vertical sealing jaws 7 are connected to assembly 8 of this invention and actuated by this assembly 8. The film tube is then passed between film feed rollers 10 and product is dropped into the pouch via fill valve 11. The horizontal heat sealing jaws 12 form the bottom of the pouch before product is filled into the pouch. The horizontal heat sealing jaws are actuated by assembly 9 of this invention. The filled pouch passes between the heat sealing jaws 12 and the top of the pouch is sealed while simultaneously forming the bottom seal of the next pouch to be filled. The filled pouch then passes down chute 13 and boxed and shipped to customers. Photo cell 14 is positioned to detect the end of the roll of film signaling the operator to install a new roll of film.

Figure 2:
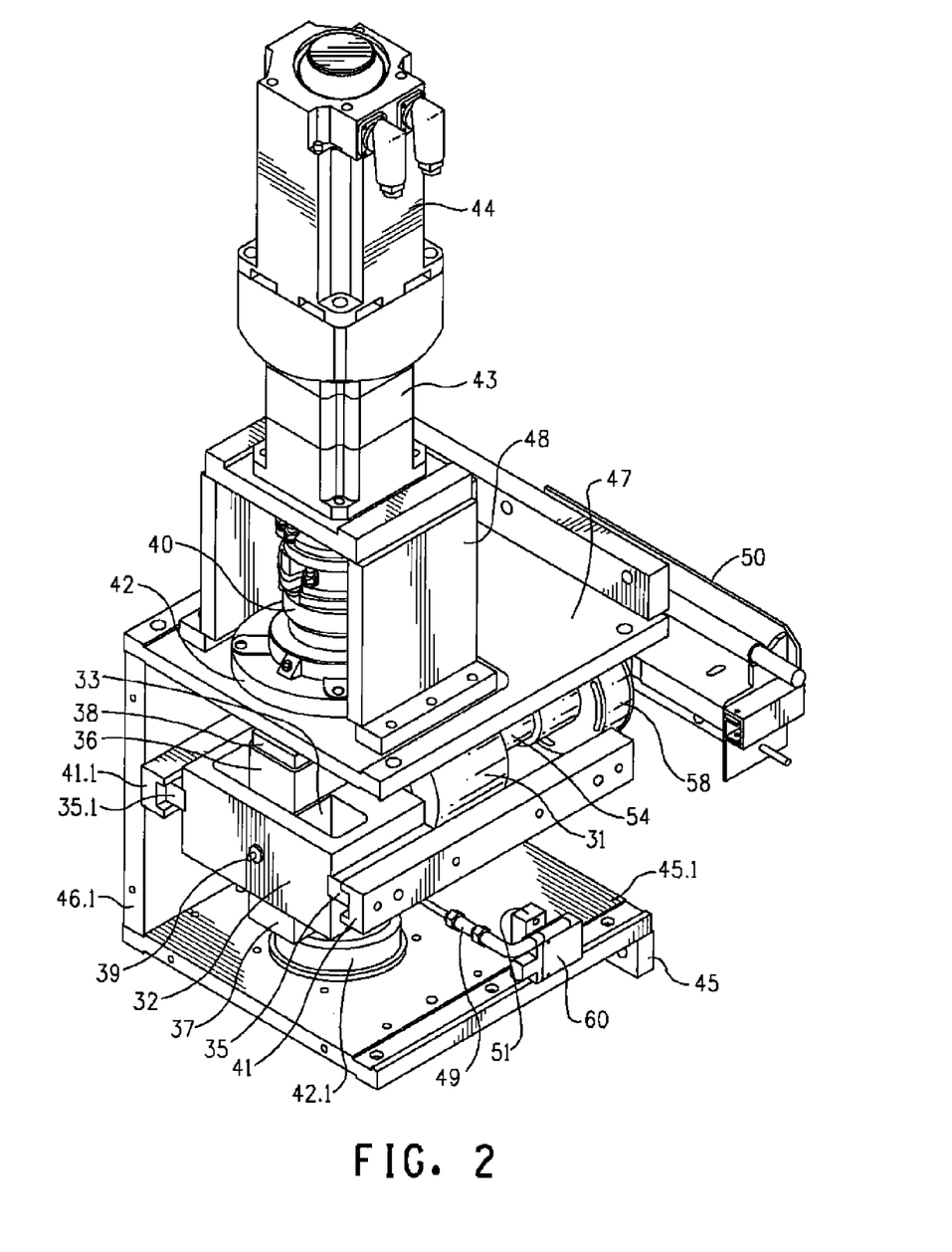
FIG. 2 illustrates a perspective view of the assembly.

FIG. 2 shows a perspective view the assembly of the invention that is used preferably in conjunction with the heat sealing device of a VFFS machine. A servo motor 44 is mounted on a motor speed reducer 43 which is mounted on motor mount assembly 48. The motor speed reducer 43 is connected to coupler mechanism 40 that is positioned in top taper roller bearing 42 attacked to the top plate of the frame 47. The top of the shaft assembly (shown in detail in FIG. 3) is positioned in the top tapered roller bearing 42 and attached to the coupler mechanism 40. The shaft assembly (see FIG. 3) is positioned in the rectangular opening in the pusher block 32 and slider block 33 having a heavy duty bearing positioned therein (see FIG. 3) rotates in this rectangular opening causing an the pusher block 32 to rotate horizontally in an oscillating motion. Right rail 35 and left rail 35.1 are attached to opposite sides of the pusher block 32 and are positioned in right and left channels 41 and 41.1, respectively, which allows the pusher block 32 to oscillate forward and backward. The pusher block 32 is attached to an actuation means 31 attached to main shaft coupling 54 which in turn is attached to key bushing 58 and actuates the heat sealing mechanism 50 of the VFFS machine. A typically useful actuation means comprise an air pressure regulated double action cylinder which can be pressurized from about 1 to 120 psi, preferably from about 15 to 90 psi. The heat sealing mechanism can be a horizontal (as shown in FIG. 1) or a vertical heat sealing mechanism or both. Diagonal or other shapes of the heat sealing mechanism can also be used. The bottom of the shaft assembly is positioned in bottom tapered roller bearing 42.1 attached to the top of the face plate 45.1. Portions of the shaft assembly that are shown (detail in FIG. 3) are the crank pin 38 connecting the crank-shaft 36 and the passive crank-shaft 37. A lubrication fitting 39 is positioned in the pusher block 32. Attached to the top face plate 45.1 is mini beam stand off 51 to which is attached mini beam 60 and a sensor 49 that counts the strokes of the pusher block 32. The front of the face plate 45 is attached to the top of the face plate 45.1 and the left side plate 46.1 is attached to the face plate 45.1.

Figure 3:
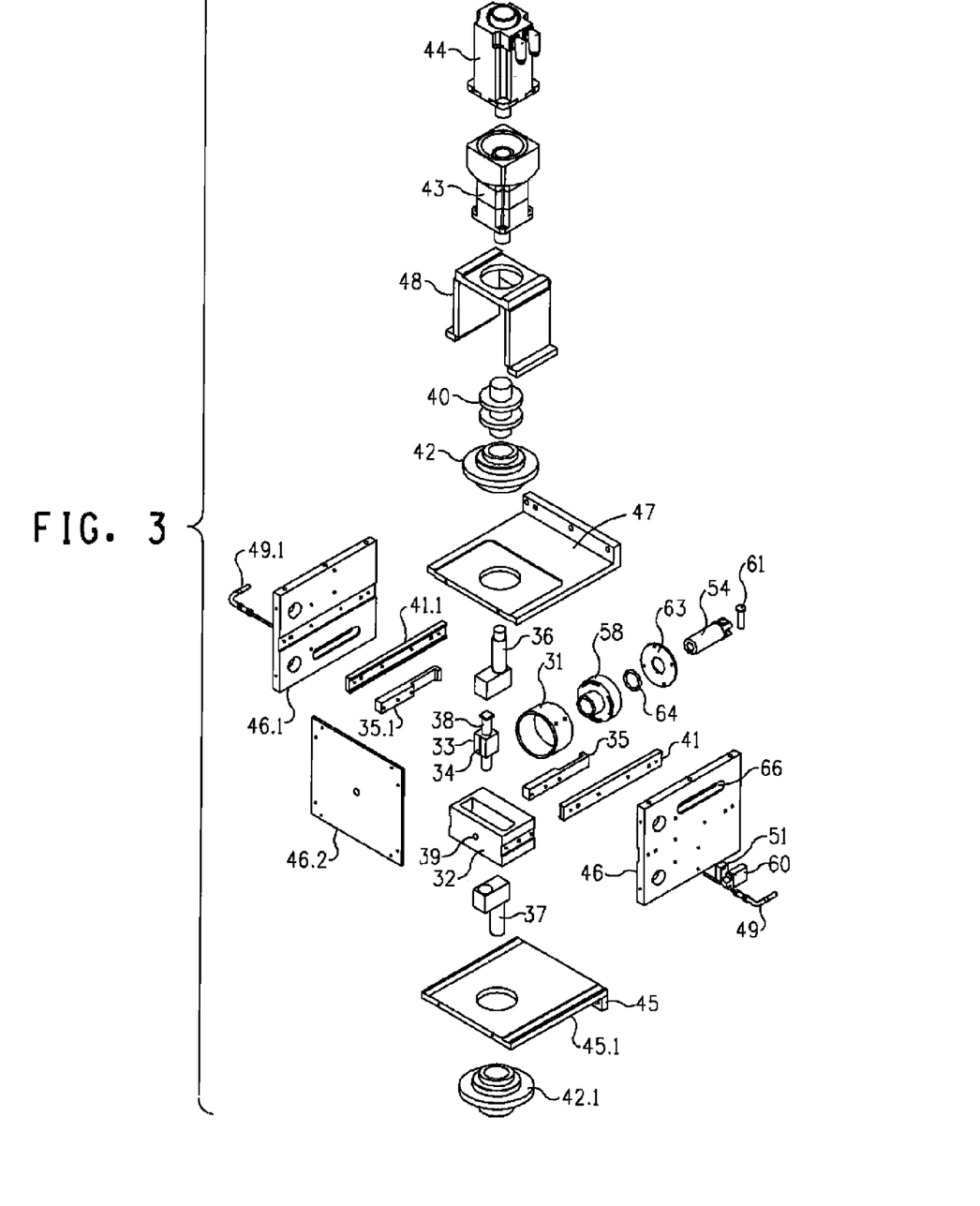
FIG. 3 illustrates an exploded view of the assembly.

FIG. 3 illustrates an exploded view of the assembly showing the shaft assembly in detail. A servo motor 44 is mounted on a motor speed reducer 43 which is mounted on motor mount assembly 48. The motor speed reducer 43 is connected to coupler mechanism 40 that is positioned in top taper roller bearing 42 attached to the top plate of the frame 47. Crank-shaft 36 is positioned in top taper roller bearing 42 and attached via crank pin 38 to passive crank-shaft 37 that is positioned in bottom taper roller bearing 42.1 attached to top face plate 45.1. Crank pin 38 passes through a central opening in slider block 33 and a heavy duty needle bearing 34 is positioned in slider block 33 which allows the slider block to freely rotate in the rectangular opening of pusher block 32 provided with a lubrication fitting 39. Slider block 33 and heavy duty needle bearing 34 attached to the crank-shaft 36 and passive crank-shaft 37 form the slider mechanism that provides forward and backward rotation to the pusher block 32. Crank pin 38 passes through an opening in the bottom horizontal portion of the crank-shaft 36 and attached to the top portion of the passive crank-shaft 37. The resulting U shaped or off-set configuration of the shaft assembly provides a horizontal reciprocating motion to the pusher block 32 which activates and deactivates the actuation means 31 which is attached to the heat sealing mechanism 50 (shown in FIG. 2) thereby engaging and disengaging the heat sealing mechanism that seals the film to form pouches and depending on its position in the VFFS machine is adapted to cut the film and form a sealed pouch.

The actuation means 31 is connected to key bushing 58 which is connected to main shaft coupling 54 that passes through shaft seal cap 63 with an O-ring 64 between the key bushing 58 and the shaft seal 63. Seal pin 61 is attached to the end of the main shaft coupling 54 and can be connected to a device that requires actuation, in this case, heat sealing mechanism 50 (shown in FIG. 2).

Pusher block 32 has a right rail and left rail attached thereto, 35 and 35.1 respectively and these rail are slidably positioned in respective channels 41 and 41.1.

The crank assembly is enclosed in a box assembly of the top face plate 45.1, side plates 46, 46.1 and 46.2 and top plate 47. Side plate 46 has a key slot 66 therein. As shown in FIG. 2, sensors 49 and 49.1 (only shown in FIG. 3) are attached to the right and left side plates 46 and 46.1 respectively by a mini beam stand-off 51 and min beam 60.

Figure 4:
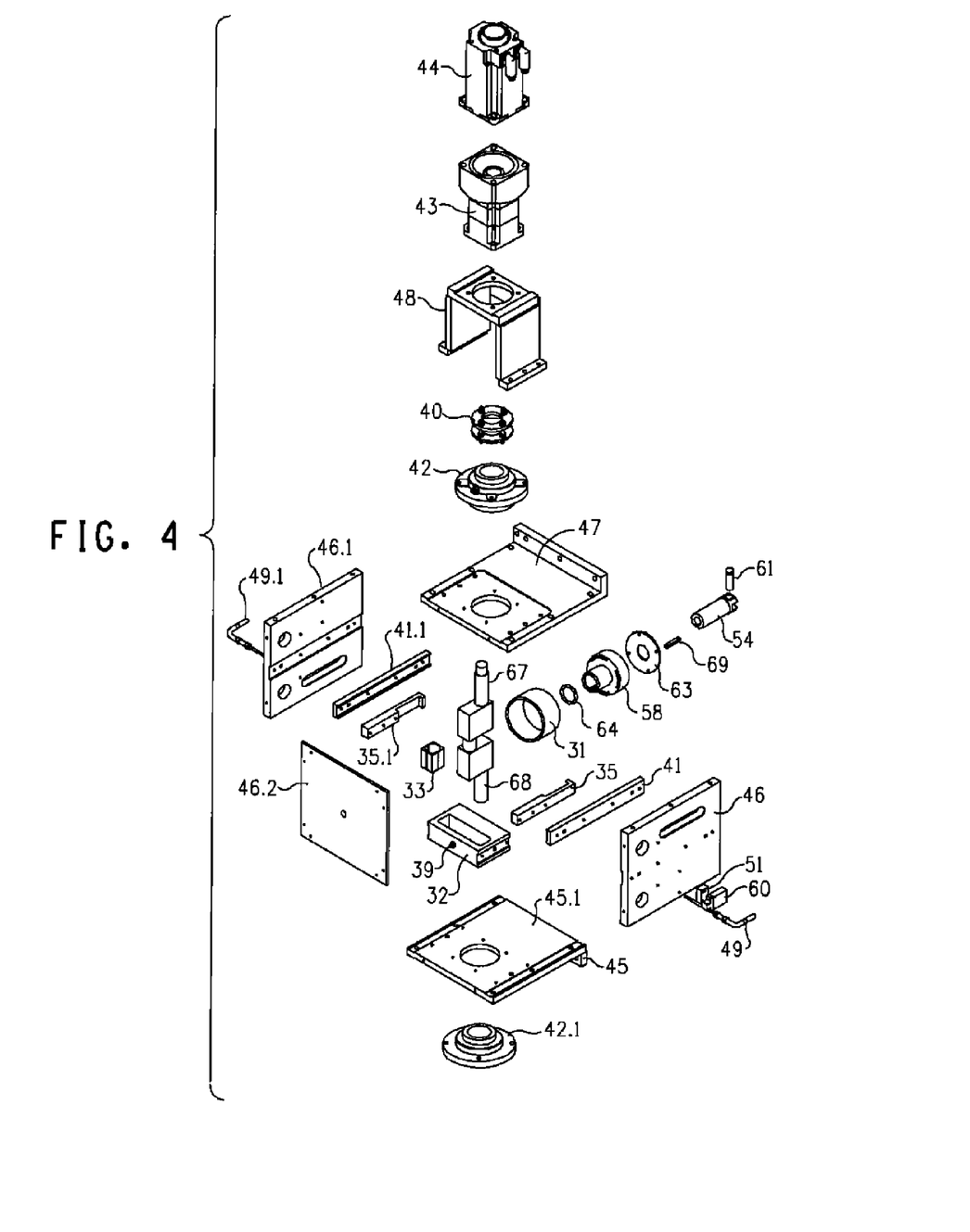
FIG. 4 illustrates an exploded view of the assembly having a modified shaft.

FIG. 4 illustrates an exploded view of the assembly showing a preferred modified shaft assembly in detail. A servo motor 44 is mounted on a motor speed reducer 43, which is mounted on motor mount assembly 48. The motor speed reducer 43 is connected to coupler mechanism 40 (slightly different design than shown in FIG. 3) that is positioned in top taper roller bearing 42 attached to the top plate of the frame 47. A single piece crank-shaft assembly 67 positioned in top taper roller bearing 42 and the bottom 68 of crank-shaft assembly is positioned in bottom taper roller bearing 42.1 attached to top face plate 45.1. (It should be noted that the single piece crank-shaft assembly 67 replaces the combination of components shown in FIG. 3 of the crank-shaft 36, crank pin 38 and passive crank-shaft 37.) A slider block 33 is positioned in the center of the single piece crank-shaft assembly 67. Typically, the slider block 33 is in two sections, which are fastened to the center of the shaft assembly 67. The slider block 33 is positioned in the rectangular opening of the pusher block 32 which allows the slider block 33 to freely rotate in the rectangular opening of pusher block 32 thereby providing a reciprocating motion to the pusher block 32. The pusher block 32 has a lubrication fitting 39 to provide lubrication to the slider block 33. (Slider block 33 attached to the crank-shaft assembly 67 forms the slider mechanism that provides forward and backward reciprocating motion to the pusher block 32). As in FIG. 3, the U shaped or off-set configuration of the shaft assembly 67 provides a horizontal reciprocating motion to the pusher block 32 which activates and deactivates the actuation means 31, which is attached to the heat sealing mechanism 50 (shown in FIG. 2) thereby engaging and disengaging the heat sealing mechanism that seals the film to form pouches and depending on its position in the VFFS machine is adapted to cut the film and form a sealed pouch.

The actuation means 31 is connected to key bushing 58, which is connected to main shaft coupling 54 that passes through shaft seal cap 63 with an O-ring 64 between the key bushing 58 and the shaft seal 63. Seal pin 61 is attached to the end of the main shaft coupling 54 and can be connected to a device that requires actuation, in this case, heat sealing mechanism 50 (shown in FIG. 2). A key 69 prevents rotation of the main shaft coupling 54 and the key bushing 58.

The pusher block 32 has a right rail and left rail attached thereto, 35 and 35.1, respectively, and these rails are slidably positioned in respective channels 41 and 41.1. The crank assembly is enclosed in a box assembly of the top face plate 45.1, side plates 46, 46.1 and 46.2, and top plate 47. As shown in FIG. 2, sensors 49 and 49.1 are attached to the right and left side plates 46 and 46.1, respectively, by a mini beam stand-off 51 and mini beam 60.

While this invention has been described with reference to illustrative embodiments and examples, the description is not intended to be construed in a limiting sense. For example, the process described herein generally relates to VFFS machines. However, the invention is not limited to VFFS machines. It could easily be applied to other machine configurations used for pouch-making. Thus, various modifications of the illustrative embodiments, as well as other embodiments of the invention, will be apparent to persons skilled in the art upon reference to this description. For example, as will be apparent to persons skilled in the art, while a number of parts are described as being present in the singular or as a pair, there could be one, two or more of these components present in the apparatus of the present invention. Further, the present invention also encompasses a system for performing the process of the present invention. As will be apparent to a person skilled in the art, while the invention has been described in terms of a single apparatus, the various steps of the process could be performed by different apparatuses that form part of a larger system.

LISTING OF PARTS IN FIGS. 1-4

1 Head tank
2 Pipe for product
3 Fill valve actuating mechanism
4 Filler pipe
5 Film guide bar
6 Vertical forming section
7 Vertical heat sealing jaw
8 Assembly for vertical heat sealing jaws
9 Assembly for horizontal heat sealing jaws
10 Film feed rollers
11 Fill valve for pouch
12 Horizontal heat sealing jaws
13 Chute
14 End of film photo cell
15 Suspended film roll unwind
16 Dancer roller
17 Unwind drive rollers
18 Coder
31 Actuation means—Air cylinder—double action air pressure regulated cylinder
32 Pusher block
33 Slider block
34 Heavy duty needle bearing (not shown in FIG. 2 but shown in FIG. 3)
35/35.1 R Rail/L Rail
36 Crank-shaft
37 Crank-shaft passive
38 Crank pin
39 Lubrication fitting
40 Coupler mechanism
41./41.1 Channel R/L
42/42.1 Top taper roller bearing/bottom taper roller bearing
43 Motor speed reducer
44 Servo motor
45/45.1 Front/top face plate
46/46.1/46.2 R side plate/L side plate/Front side plate
47 Top plate of frame
48 Motor mount assembly 49/49.1 Sensor
50 Heat-sealing mechanism
51 Mini beam stand off
54 Main shaft coupling
58 Key bushing
60 Mini beam
61 Seal pin
63 Shaft seal
64 O-ring
66 Key slot
67 Single piece crank-shaft assembly
68 Bottom of crank-shaft assembly 67
69 Key

What is claimed:

1. A process for forming and filling a pouch on a Vertical Form Fill Seal (VFFS) machine comprising the steps of:
   (1) providing a continuous tube of flexible and sealable film;
   (2) supplying the continuous tube with a predetermined flow-rate of flowable material fed from an external balance tank; wherein said balance tank comprises an inlet for said flowable material, at least one outlet for said flowable material, and at least one stand-pipe within said balance tank and over said at least one outlet, wherein said stand-pipe is flowably attached to said at least one outlet and filling the pouch;
   (3) sealing the pouch with heat sealing jaws used in conjunction with the VFFS machine;
   wherein the VFFS machine comprises an assembly for producing an oscillating force that actuates a heat sealing mechanism and comprises the following:
      a. a frame having a top, a bottom, and opposing sides;
      b. horizontal channels each attached to said opposing sides of said frame;
      c. a servo motor positioned on the top of said frame;
      d. a shaft assembly having a top end and a bottom end;
      wherein said top end is attached to said servo motor and said bottom end is positioned adjacent to said bottom of said frame; and
      e. an off-set slider mechanism being centrally positioned on the shaft assembly;
      f. a pusher block having a rectangular-shaped opening therein, and horizontal rails
      each attached to the opposite sides of said pusher block;
      wherein each said horizontal rails is slidably positioned in said horizontal channels attached to said opposing sides of said frame, and
      wherein said off-set slider mechanism of said shaft assembly is positioned in said rectangular-shaped opening of said pusher block;
      g. an actuation means comprising a double action air pressure regulated cylinder
      attached to said pusher block permitting the adjustment of pressure applied by the heat sealing mechanism; and
      h. the heat sealing mechanism that is actuated by said actuation means;
   whereby said servo motor, when actuated, drives said shaft assembly positioned in said pusher block,
   whereby said off-set slider mechanism moves said pusher block and provides a forward and backward motion to said pusher block sliding in said horizontal rails, and
   whereby said pusher block provides an oscillating force to said actuation means, thereby activating the heat sealing mechanism and sealing the flexible film forming the pouch and on deactivating said actuation means disengaging the heat sealing mechanism thereby allowing the pouch formed to advance through the VFFS machine.

2. The process of claim 1 wherein the VFFS machine comprises said shaft assembly having a top section attached to said servo motor, a center section offset from the top section and a bottom section positioned in a bearing on the bottom of the frame and in alignment with the top section and wherein the center section of the shaft assembly being rotatable mounted in the rectangular opening in the pusher block.

* * * * *

UNITED STATES PATENT AND TRADEMARK OFFICE
CERTIFICATE OF CORRECTION

PATENT NO. : 9,440,757 B2
APPLICATION NO. : 15/086232
DATED : September 13, 2016
INVENTOR(S) : Kastens It is certified that error appears in the above-identified patent and that said Letters Patent is hereby corrected as shown below:

In the Specification

Column 4, Line 20, after "causing" delete the word "an"

Signed and Sealed this
Third Day of January, 2017

Michelle K. Lee
*Director of the United States Patent and Trademark Office*